ENDLESS TAPE CARTRIDE

Filed Sept. 5, 1967 2 Sheets-Sheet 1

INVENTOR.
GEORGE F. LINNING
BY Baie, Freeman & Molinare
ATTORNEYS

ENDLESS TAPE CARTRIDE

Filed Sept. 5, 1967 2 Sheets-Sheet 2

INVENTOR.
GEORGE F. LINNING
BY Bair, Freeman & Molinare
ATTORNEYS

United States Patent Office 3,489,362
Patented Jan. 13, 1970

3,489,362
ENDLESS TAPE CARTRIDGE

George F. Linning, Des Plaines, Ill., assignor to Amerline Corporation, a corporation of Illinois Filed Sept. 5, 1967, Ser. No. 665,446
Int. Cl. B65h 75/34
U.S. Cl. 242—55.19 4 Claims

ABSTRACT OF THE DISCLOSURE

A hollow, molded-plastic magazine containing an "endless" loop of magnetic recording tape. The major portion of the tape is wound into a spiral coil, the remainder of the loop being aligned along a path joining the inner and outer convolutions of the coil. This coil rests on a disc-shaped turntable which is coupled by a drive belt to a pinch roller carried in the magazine. When the magazine is inserted into a playback instrument, a capstan bears against the pinch roller to directly drive both the pinch roller and the turntable.

Background of the invention

This invention relates generally to magnetic sound tape recording and playback systems and, more particularly, to an improved magazine for carrying an endless tape reel.

Magazine-loaded "stereo" tape players are enjoying increasing popularity, particularly in automobile installations, due to the convenience with which the magazine-held tape may be handled. Threading is eliminated since the magazine merely "plugs in" to the player. Rewinding is likewise made unnecessary by joining the ends of the coil tape to form an "endless" loop capable of continuous operation. An earlier endless tape magazine of this basic type is disclosed in U.S. Patent 2,922,642, which issued to B. A. Cousino on Jan. 26, 1960.

In the preferred endless tape systems, the tape is wound into a spiral coil which rests on a rotatable disc or turntable. The inner and outermost convolutions of the coil are joined together by a loop of tape which is passed through guides in the magazine adjacent the pickup head assembly. At another point on this uncoiled loop, the tape is sandwiched between a drive capstan and a pinch roller. In prior magazines, the tape supporting turntable rotates freely during operation. Rotation of the capstan pulls the tape from the inner convolution and through the magazine tape guides at a constant linear speed, causing the turntable to roate and rewinding the played tape onto the outside convolution of the coil.

Because the tape located at the outer convolution must have the same linear speed as the tape in the inner convolution, the greater periphery of the outer convolution requires that it move at a slower angular speed than the inner convolution. Thus, every convolution in the coil must be able to slip with respect to its neighbors. To permit this relative motion, the tape is commonly coated with a graphite lubricant.

As the magazine is handled, the tape is likely to become tangled. This likelihood is increased by the slippery character of the tape which allows convolutions to become easily unraveled from the main body of the coil. Moreover, since the coil is normally mounted on a freely rotatable platform, the tape may become snarled due to undesirable platform rotation. Unless first disentangled, the tape will normally break during a subsequent attempt to use the magazine.

These problems may be alleviated to some extent by utilizing a brake adapted to secure the tape-carrying turntable in a fixed position when the magazine is not in use.

A preferred type of reel brake construction is disclosed in U.S. patent application Ser. No. 560,245 filed June 24, 1966 by Robert Becker and Arnold P. Hultgren, now Patent No. 3,438,591.

Even when a tape reel brake is employed, however, significant problems remain. Because the tape is employed to drive the turntable, as well as serving as a recording medium, the tape must be made thicker than would otherwise be necessary in order to possess adequate tensile strength. Increased tape thickness enlarges the size of the tape coil and limits the amount of tape which can be stored within the cartridge. Furthermore, because the tape must perform the work of rotating the turntable, it is held under increased tension as it follows its tortuous path through the tape guides within the magazine. The increased wearing of the tape which results significantly reduces the operating life of the tape-carrying magazine.

Moreover, even when a tape reel brake is employed, the section of tape connecting the inner and outer convolutions of the coil may become quite slack as the magazine is handled. When the cartridge is inserted into the player and the drive capstan begins to feed tape past the pinch roller toward the outer convolution on the coil, a substantial build-up of tape may occur on the output side of the combination pinch roller and drive capstan. This results from the fact that, until the slack is taken up, no driving force is applied to the turntable by the slack tape. Until the turntable rotates, no tape is rewound on the outer convolution of the coil. This effect increases the possibility that the tape will become entangled with the pinch roller, drive capstan, or snarled in some other portion of the magazine, usually causing the tape to break.

Summary of the invention

In a principal aspect, the present invention takes the form of an arrangement for directly coupling the pinch roller to the turntable in an endless tape magazine. Preferably, the coupling means employed comprise an elastic belt stretched from the central hub of the turntable to the hub of the pinch roller, the two hubs behaving as pulleys. The drive belt causes the turntable to rotate as soon as the magazine is placed in operation, preventing undesirable initial tape buildup on the output side of the pinch roller. Moreover, the driving belt relieves the tape from the job of rotating the turntable, thus reducing the tension to which it is subjected during operation. In consequence, the tape can be made thinner, increasing the tape-carrying capacity of the magazine. In addition, by reducing the load on the tape, a substantial increase in the operating life of the cartridge is achieved.

These and other objects, features and advantages of the invention will become more apparent through a consideration of the following detailed description. In the course of this description, frequent reference will be made to the attached drawings.

Description of the preferred embodiments

Figure 1:
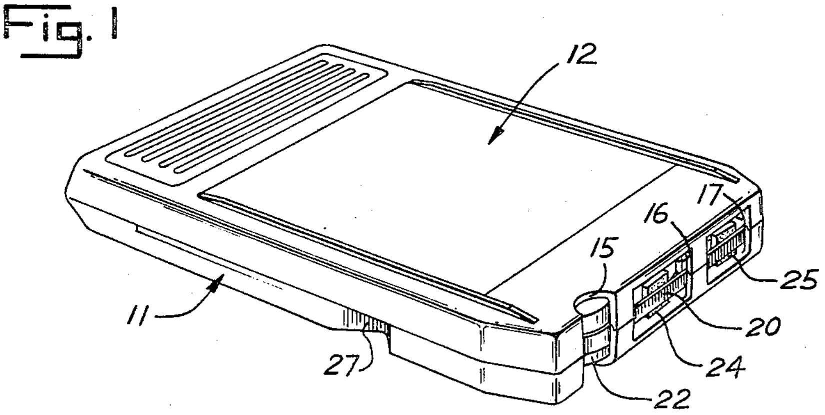
FIGURE 1 is a perspective view showing the exterior of the assembled tape-carrying magazine.

The exterior of a preferred tape-carrying magazine embodying the principles of the invention is shown in FIGURE 1 of the drawings. The magazine case comprises a base section indicated generally at 11 and a cover indicated generally at 12, each of which is constructed of a molded plastic such as polystyrene. Three apertures 15, 16 and 17 are defined in one end of the magazine to expose the tape 20. At aperture 15, the tape 20 is backed-up by a pinch roller 22 and at apertures 16 and 17 by pressure pads 24 and 25 respectively. When inserted into a tape player, the tape 20 at aperture 16 is sandwiched between the pinch roller 22 and a rotating drive capstan (not shown), thereby applying motive force to both the tape 20 and to the pinch roller 22. The apertures 16 and 17 permit engagement of the tape with a playback head, a recording head, and/or tape responsive control devices in the playback instrument. A spring biased latching arm (not shown) on the playback instrument engages with a latching notch 27 in the base section 12 to secure the cartridge in operating position.

Figure 2:
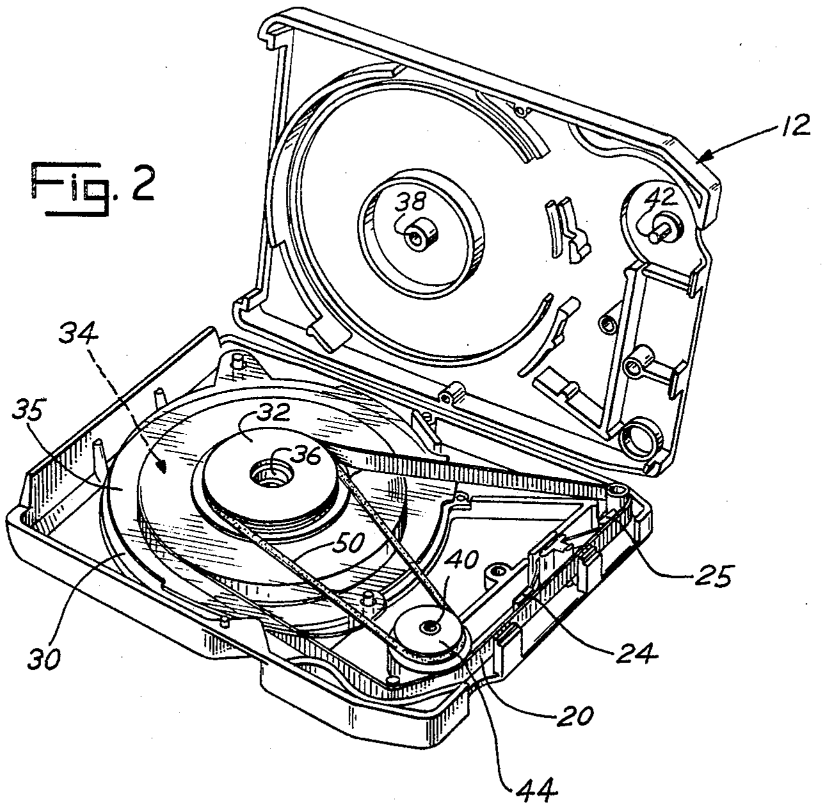
FIGURE 2 is a perspective view of the magazine shown with the cover opened and with the tape reel assembly and drive belt in place.

As shown in FIGURE 2 of the drawings, an endless tape reel assembly is fitted within the magazine. This reel assembly comprises a rotatable, disc-shaped turntable 30 and a central hub 32 which support a spiral coil of tape shown generally at 34. As shown, the body of tape coil 34 lies immediately below a transparent tape retaining panel 35 cut from sheet cellophane or the like. The tape loop 20, which passes near apertures 15, 16 and 17, joins the inner and outermost convolutions of the coil 34. With the cover in position as shown in FIGURE 1, the turntable 30 and the hub 32 are coaxially mounted on an axle formed by the lower axle half 36 (fixedly mounted on the base section 11) and the upper axle half 38 (fixedly mounted on the cover 12).

The pinch roller 22 rotates about an axle formed by the hollow stem 40 (which is a molded part of the base section 11) and a stud which is mounted on the cover 12 and which extends downwardly into the hollow stem 40 when the cover 12 is in position. The pinch roller 22 itself is constructed of rubber or another resilient material and is mounted on a molded plastic hub 44.

In accordance with the invention, an elastic belt 50 surrounds and is stretched between the turntable hub 32 and the pinch roller hub 44, directly coupling the two together. Thus, when the drive capstan of the playback instrument bears against and rotates the pinch roller 22, the turntable 30 is also immediately rotated.

Figure 3:
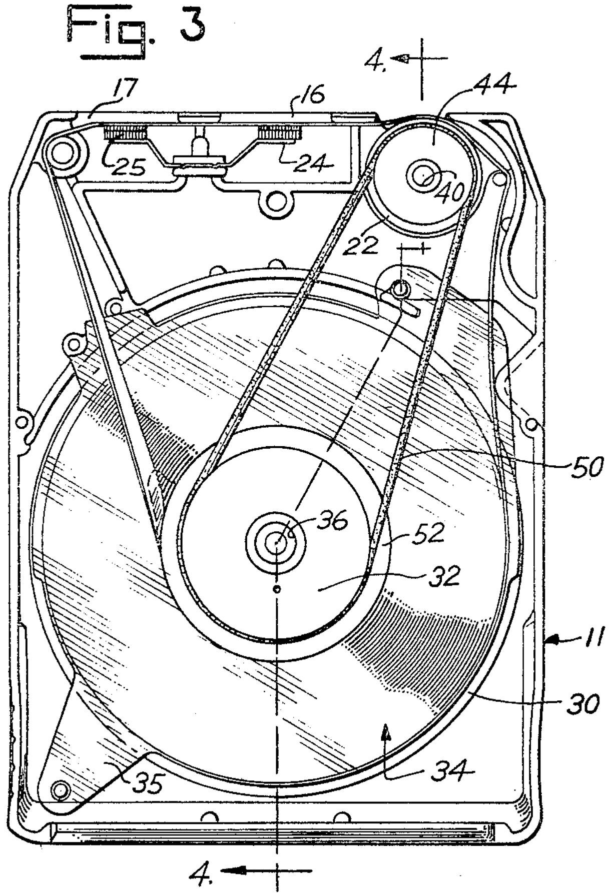
FIGURE 3 is a top elevational view of the base section of the magazine.
Figure 4:
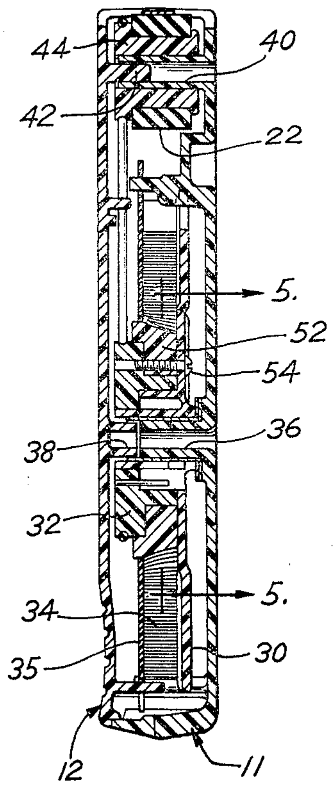
FIGURE 4 is a cross sectional view of the magazine taken substantially along the line 4—4 of FIGURE 3.

As clearly seen in FIGURES 3 and 4 of the drawings, the inner convolution of the tape coil 34 is in contact with a tape reel ring 52 which surrounds the hub 32. As shown in FIGURE 4, the ring 52 may be rigidly affixed to the hub 32 by means of a retaining screw 54. Alternatively, the ring 52 may be permitted to rotate freely or "float" with respect to the turntable 30 and hub 32, retaining screw 54 being eliminated. This alternative "floating reel hub" construction allows the inner convolution of the tape coil 34 to move more freely with respect to the rotating turntable.

Preferably, the effective pulley diameters of hubs 32 and 44 are so proportioned that the linear speed of the tape 20 as it passes the pinch roller 22 is substantially equal to (or slightly larger than) the linear speed of that portion of turntable 30 which is immediately below the outer convolution of the coil 34. This relationship may be accomplished by setting the ratio of the diameters of the hubs 32 and 44 equal to the ratio of the diameters of pinch roller 22 and the inner convolution of coil 34.

The stretched elastic drive belt 50 tends to create a slight binding action between the hub 32 and its axles 38 and 36 and a similar binding action of the pinch roller hub 44 with its axle 40. As a result, a slight but nevertheless quite effective braking action exists which tends to retard the motion of both the pinch roller 22 and the turntable 30 when the cartridge is not in use. This action, coupled with the function of the tape retaining plate 35, effectively prevents unraveling of the coil 34 when the tape magazine is being handled.

Figure 5:
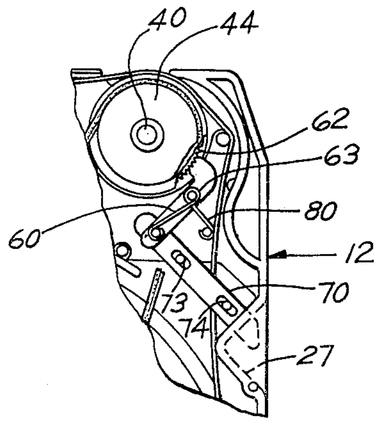
FIGURE 5 is a partial top view of an alternative embodiment of the invention employing a brake for securing the turntable and the pinch roller when the magazine is being handled and stored.

To provide a more positive braking action when the magazine is not in operation, a spring-loaded brake of the type depicted in FIGURE 5 of the drawings may be employed. A toothed pivot arm 60 is positioned to engage with serrations in hub 44 below the pinch roller 22. Pivot member 60 rotates about a pivot stud 63 affixed to the floor of base section 12. A slot in pivot member 60 opposite from its toothed end receives an upwardly extending pin from an actuating member 70. Actuating member 70 extends outwardly through an opening in the side wall of the magazine latching notch 27 and is mounted for translational motion by means of guide pins 73 and 74 which extend upwardly through slots in the actuating member 70. A torsion spring 80 holds the pivot member 60 in normally engaged position with the serrations 62 on hub 44. When the cartridge is placed in operation, the latching arm (not shown) on the playback instrument depresses actuating member 70 to deflect the pivot member 60 away from the serrations 62, releasing hub 44 for rotation. It should be noted that, due to the presence of drive belt 50, the normally latched pinch roller hub 44 also serves to retain the turntable 30 in position.

It is to be understood that the embodiments of the invention which has been described are merely illustrative of two applications of the principles of the invention. Numerous modifications may be made without departing from the true spirit and scope of the invention.

What is claimed is:

1. In a tape carrying magazine of the class comprising a hollow housing, a disc-shaped turntable mounted for rotation within said housing, a spiral wound coil of magnetic recording tape supported on said turntable, the innermost and outermost convolutions of said coil being joined by a length of tape separate from said coil, said length of tape together with said coil forming a continuous tape loop, and a rotatable roller mounted in said housing adjacent to an opening in said housing, a segment of said tape loop passing adjacent said roller and said opening whereby a drive capstan external from said housing may be brought into contact with said roller through said opening thus pinching said tape segment between said capstan and said roller, the improvement comprising drive means operable independently of the motion of said tape for coupling said roller to said turntable.

2. The improvement as set forth in claim 1 wherein said drive means comprises a first pulley hub coaxially mounted for rotation with said roller, a second pulley hub coaxially mounted for rotation with said turntable, and a drive belt for coupling said pulley hubs for mutual rotation.

3. The improvement as set forth in claim 2 wherein said drive belt is constructed of an elastic material and is stretched between said hubs.

4. The improvement as set forth in claim 2 wherein the ratio of the effective diameters of said first and second pulley hubs is substantially equal to the ratio of the diameters of said roller and said inner convolution.

References Cited

UNITED STATES PATENTS

| | | | |
|---|---|---|---|
| 1,244,918 | 10/1917 | Thomas | 242—55.13 |
| 3,322,360 | 5/1967 | Roys | 242—55.19 |

LEONARD D. CHRISTIAN, Primary Examiner